United States Patent [19]

Gray

[11] 3,909,282

[45] Sept. 30, 1975

[54] COLORANTS FOR PHOTOPOLYMERIZED IMAGES

[75] Inventor: Russell Houston Gray, Rumson, N.J.

[73] Assignee: E. I. Du Pont de Nemours and Company, Wilmington, Del.

[22] Filed: Mar. 14, 1973

[21] Appl. No.: 341,251

Related U.S. Application Data

[63] Continuation-in-part of Ser. No. 285,617, Sept. 1, 1972, abandoned.

[52] U.S. Cl. ............... 106/288 Q; 96/28; 96/115 P; 106/204; 106/214; 106/193 J

[51] Int. Cl.$^2$ ............................................ C09D 3/00

[58] Field of Search ....... 106/288 Q, 309, 204, 214, 106/272, 193 J, 193 P, 193 D; 96/28, 115 P

[56] References Cited

UNITED STATES PATENTS

| | | | |
|---|---|---|---|
| 3,060,023 | 10/1962 | Burg et al. | 96/28 |
| 3,060,024 | 10/1962 | Burg et al. | 96/28 |
| 3,345,293 | 10/1967 | Bartoszewicz et al. | 186/288 Q |
| 3,445,229 | 5/1969 | Webers | 96/28 |
| 3,473,940 | 10/1969 | Walsh | 106/288 Q |

*Primary Examiner*—Patrick P. Garvin
*Assistant Examiner*—J. V. Howard

[57] ABSTRACT

Colorants useful in toning photopolymerized images are made from mixtures of pigmented resin particles, said particles being mixed with one or more inert powders selected from the group consisting of organic and silicone compounds. When said powders are mixed with at least one of two pigmented resins having different color densities, a colorant with a predictable intermediate density is obtained when said pigmented resins are mixed.

15 Claims, No Drawings

COLORANTS FOR PHOTOPOLYMERIZED IMAGES

This application is a continuation-in-part of my application U.S. Ser. No. 285,617 and filed Sept. 1, 1972, now abandoned.

BACKGROUND OF THE INVENTION

1. Field of the Invention

This invention relates to elements photohardenable by exposure to actinic radiation and more particularly to photohardenable elements where the stick temperature has been selectively raised in those areas receiving said radiation and to colorant materials used to develop the image by adhering to the underexposed areas of the layer. More particularly this invention relates to new and improved colorants useful in the above development step and to their process of use. Still more particularly this invention relates to colorants which can be mixed to obtain predictable reflection density values and to colorants with improved values such as increased reflection density or covering power.

2. Description of Prior Art

The use of pigments or colorants to dust on exposed photopolymerizable elements in order to develop the image contained therein is well-known and has been fully disclosed in, for example assignee's Burg and Cohen, U.S. Pat. No. 3,060,024, Oct. 23, 1962. Useful pigments which produce this image without a subsequent staining effect are described in assignee's Chu and Manger, U.S. Pat. No. 3,620,726 dated Nov. 16, 1971. It has been found, however, that when one blends a high density toner with one of lesser strength one does not necessarily obtain a linear relationship of amount blended with the resultant reflection density.

SUMMARY OF THE INVENTION

It is an object of this invention to provide colorants useful for dusting on photopolymerized images. Another object of this invention is to provide a new method of making said colorants. A further object is to provide a colorant with a high reflection density that can be usefully blended with one of lower reflection density to a predictable intermediate density.

These and other objects of the invention are achieved by providing a colorant of predictable reflection density comprising a mixture of at least one inert powder selected from organic and silicone compounds having an average particle size of 1 to 1000 microns and at least two particulate, pigmented resins having different reflection densities. The colorants of this invention are made by mixing said pigmented resins, at least one of which contains one or more of the inert powders before mixing, to form the colorant of predictable reflection density.

DESCRIPTION OF THE PREFERRED EMBODIMENTS

In preferred embodiments, the inert powders are non-electroscopic and are present in an amount of 0.1 to 100 parts of powder per part of pigmented resin, by volume. Preferably, the powders and pigmented resin are mixed together in approximately equal amounts by volume. The reflection densities of the pigmented resins and colorants of the invention are determined for purposes of this invention, from photopolymerizable images toned therewith. The toning of such images is illustrated in U.S. Pat. No. 3,649,268 and other patents of the prior art.

The particulate, pigmented resins preferably have an average particle size of 0.2 to 50 microns, not more than 20% of the resin particles being larger than 105 microns in diameter, and are comprised of resin particles having pigment particles dispersed in them or on their surfaces and are prepared by milling or mixing resin particles together with pigments of very small particle size. The reflection density of the resin depends on how much pigment is dispersed in the resin particles. Usually, a batch of high strength toner is made by mixing resin particles containing a large amount of pigment, and therefore having a high reflection density, with one or more of the aforesaid inert powders. The resulting mixture is then mixed with a batch of low strength toner comprised of resin particles containing a small amount of pigment, to produce a colorant of intermediate reflection density which is predictable from a linear relationship between the volume concentrations and reflection densities of the high and low strength toners in the colorant.

The colorants of the invention have reflection densities which can be predicted from the amounts and reflection densities of its components as described above due to the surprising effect of the inert powders on the combined reflection densities of the mixed resins. When two particulate resins of the invention are mixed, one of which contains one or more of the inert powders, the resulting colorant has a predictable reflection density intermediate between the reflection densities of the resins. In applications where an accurate color density is desired, such as dusting or toning an imagewise exposed photopolymerizable layer to form a colored image, this predictability is highly desirable. Colorants produced by the prior art, such as those described by Chu and Manger, U.S. Pat. No. 3,620,726, when so blended, do not always produce predictable reflection density values. In fact, it is known that these blends sometimes have the same reflection density value as the pigment dispersion having the highest value, that is, no reduction in density is achieved. This is highly objectionable and cannot be tolerated in the industry where these colorants are widely used to tone photopolymer elements so as to obtain a reflected color image of the desired density value.

Pigments of the desired color characteristics are dispersed in a particulate resin matrix, such as cellulose acetate, as taught by Visce in U.S. Pat. No. 2,649,382, Aug. 18, 1953 and further by Chu et al. in U.S. Pat. No. 3,620,726, Nov. 16, 1971, to form pigmented resins with an average particle size of 0.2 to 50 microns in diameter, no more than about 20% of the particles being larger than 105 microns in diameter. The dispersion is then further mixed with one or more inert, organic or silicone, preferably organic, powders with a particle size between 1.0 and 1000 microns in diameter, preferably having a melting point between 40° and 300°C. and being nonelectroscopic, i.e., being neither repelled from nor attracted to a charged rod placed in proximity to the powders. It is preferred that these powders be substantially colorless. However, they may also be the same color as or contain a small amount of the same pigment used to prepare the pigment dispersion above. The powder may consist of any organic or silicone material as long as it is unreactive with the resin. These inert powders are added to the pigment dispersion in an amount of about 0.1 parts to 100 parts of inert powder per part of pigment dispersion depending on the size of the inert powder used. A colorant thus made will produce excellent stain free images when used to tone an exposed photopolymer material. Further, when one blends a high strength colorant made in this manner with one of weaker strength (i.e., less pigment imbedded in the resin matrix) one obtains a linear relationship between toned reflection density of the two components making it possible to predict the reflection density of any desired mixture. This was not possible to do with the colorants of the prior art. The colorants of the invention can also provide a greatly improved amount of covering power for a given amount of pigment. Since pigments are generally quite expensive, the colorants of the invention provide an important economy in their use.

Preferred inert powders useful in the practice of this invention include conventional polyethylene particles reduced in size to less than 30 microns, finely ground cellulose acetate, mildly oxygenated Fischer-Tropsch hydrocarbon hard wax (melting point 210°–215°F), polyolefins, other natural and synthetic waxes, powdered starch, polyvinyl alcohol, polymethylmethacrylates, polyethylmethacrylates, and the resins of U.S. Pat. No. 3,620,726 described above. Other finely divided (less than 1000 microns) materials which are unreactive with the pigment dispersion and preferably have a melting point between 40° and 300°C, are composed of either organic or silicone compounds, and which will preferably not become electrostatically charged when placed in proximity to a charged object, will function within the ambit of this invention.

The particle size of the inert powders to be used in the practice of this invention fall between 1 to 1000 microns. Larger particle sizes may be employed if the means of mixing employed to blend the toner with said inert powder is severe enough to reduce the resulting mixture to the preferred range of 1 to 1000 microns. One such mixing device employed is the so-called "hammer mill" wherein loose blade-like elements are attached to the shaft of the motor. When the elements to be mixed are introduced therein the loose blades "hammer" the particles breaking up the larger pieces while at the same time effectively mixing all the elements together.

In yet another embodiment the toner may be loosely blended with one or more of the powders and subsequently heated at a point just above the softening point of the powder, i.e. Fischer-Tropsch hydrocarbon hard wax. As time at a fixed temperature increases, or as temperature increases, the amount of blending error found decreases while the covering power, as measured by the reflection density found when one tones an image with the toner containing the powder alone, increases substantially. The same effect of increased covering power is noted when the toners are prepared with the inert powder of this invention, and subjected to relatively long periods of severe blending. Here one finds that the blending error is compensated for in a short blending time. But with increased blending time and speed the reflection density of the image toned therefrom also increases. The increased covering power and decreased amount of mechanical blending required, while still overcoming the blending error problem, represent a very substantial improvement in the manufacture of commercial toners.

To produce the pigmented resins, the pigment particles are first imbedded in or milled with any convenient resin-like material as disclosed, for example in U.S. Pat. No. 3,620,726, including polyvinyl chloride, cellulose acetate (preferred), cellulose acetate butyrate, polystyrene, polymethyl methacrylate, as well as water soluble polymeric matrices such as polyvinyl alcohol, methyl cellulose, carboxymethyl cellulose, the particular matrix used depending on the mechanical means of processing the colorant to the effective particle size and the desired end-use in the dusting or toning step. Pigment dispersions of increased color strength are made with higher pigment loading during this step.

It is disclosed in the prior art that pigments or pigment dispersions may be dispersed with wetting aids, surfactants, extenders, softeners and other adjuvants to facilitate handling or in the process of use to prevent staining by adhering to areas other than those desired. It is necessary, however, to blend pigment dispersions of varying strengths so as to obtain a predictable intermediate reflection density. This has often proved impossible when pigment dispersions of high reflection density are blended with others of lower reflection density. It might be expected that equal mixtures of two pigment dispersions would produce one with an expected reflected density (as measured from the toned image) exactly between that of the higher and of the lower values from the two mixes. In fact, however, one finds that, depending on the colors used, one obtains reflection density above the midway point and, in some cases, even equal to the reflection density of the higher density pigment dispersion used in this instance. This unpredictable value (herein referred to as "blending error" [or "% error"]) is intolerable where these dispersed pigments or "toners" are used to tone the unhardened or tacky area of a photopolymer image. The operator of such a system is in need of precise color control, and "hit-or-miss" methods used to obtain these colors are costly and time consuming. It has now been found that the addition of one or more of the inert powders of this invention, powders which in and of themselves do not add to the color of the pigment dispersion, allow one to successfully blend pigmented resins of high and low density and achieve a predictable reflection density between the high and low values, dependent on the amount of each blended therein. When equal volumes of two pigmented resins are combined in accordance with the invention, the reflection density of the colorant thus formed should be equal to the average of the reflection densities of the individual resins, as illustrated in the examples. The difference between the reflection densities of the individual resins may be any amount, although when mixing two pigmented resins the reflection density of the more highly pigmented resin will usually be at least 10% greater than that of the less pigmented resin, and preferably more. The inert powders are first added to one or more of the pigmented resins which are then mixed as illustrated in the examples. The reflection density of the colorant is determined by, and is therefore predictable from, the volume concentrations and reflection densities of the pigmented resins (including the powder mixed therewith). After blending one or more of the pigmented resins with one or more inert powders, the reflection density of each pigmented resin is measured. The colorants produced therewith will have reflection densities approximately equal to the sum of the volume concentration of each pigmented resin in the colorant multiplied by its reflection density. The blending error is the amount by which the reflection density so calculated differs from the actual reflection density of the colorant; it is preferred that sufficient powder be added so that the blending error does not exceed about 10%. Thus, if a colorant is produced by mixing one part of a pigmented resin with a reflection density of 2 with two parts, by volume, of a pigmented resin having a reflection density of 1, the predicted value of reflection density of the colorant determined by a linear proportion between volume concentrations and reflection densities is 1.33 (i.e., $\frac{1}{3} \times 2 + \frac{2}{3} \times 1 = 1.33$), and the actual reflection density should not differ from 1.33 by more than 10% of this value.

When one uses pigmented resins without the inert colorless powders of this invention, the colorant particles are packed closely together and have low covering power whereas blending or mixing with the inert colorless powders of this invention increases the covering power of the colorant. Additionally, the product so made exhibits a lower propensity to cause staining than colorants or pigment dispersions which do not have the inert colorless powders of this invention.

In addition to using inert colorless powders, one may add a small amount of the pigment to the inert powders themselves so that the material to be added to the pigment dispersion to form the final toner has the same color but at a much lower density. Powders containing small amounts of pigment may be used with the same effect on toner blending and final predictable reflection density.

The inert powders useful in blending with the toners to produce the colorants of this invention are preferably nonelectroscopic, i.e., are not affected by charged objects, as illustrated hereinafter.

The above products are particularly useful in applying a color to the unexposed areas of the photopolymerized elements disclosed, for example in U.S. Pat. No. 3,649,268 as well as others as described in the prior art shown within this reference, but the elements of U.S. Pat. No. 3,649,268 are particularly useful. These elements comprise a photohardenable element laminated to a receptor surface, containing a removable support or cover sheet superimposed thereon which is transparent to actinic radiation. An image is exposed to actinic radiation through said transparent cover sheet which selectively raises the stick temperature of those areas receiving the radiation. Subsequently, the transparent cover sheet is peeled off and the colorants of this invention are applied to the photopolymer layer, said colorants adhering only to the underexposed areas, revealing a colored image of the original. Repeating the laminating, exposing, peeling, colorant application steps in sequence with other images and colorants can result in a multicolor image.

The colorants of this invention may also be used in any other process where staining or toning are used such as in the art field. Anywhere reflection density of a colorant is useful and where intermediate blending is used to obtain colorants and where predictable end-values of color density are important, the colorants of this invention may also find use.

The invention will now be illustrated by the following examples in which parts and percentages are by volume:

EXAMPLE 1

To exemplify the high blending error which is incurred by blending the toners of the prior art a suitable black pigment (a calcined copper-chrome-cobalt complex), was dispersed in cellulose acetate using an acetone-water solvent in a ball-mill mixer as taught by U.S. Pat. No. 2,649,382, issued Aug. 18, 1953. The first sample (A) was prepared so that after drying the toner was composed of about 67% black pigment and about 33% cellulose acetate resin. A second toner (B) was made using the same black pigment under the same conditions except that after drying the toner was composed of about 30% pigment and about 70% of the resin. A third toner (C) was made by mixing equal parts of A and B. A photopolymer element comprising a high molecular weight polymethyl-methacrylate binder similar to those described in Chu et al. U.S. Pat. No. 3,649,268, Mar. 14, 1972 was prepared. Three samples of this element were laminated at ca. 105°C. to Kromekote paper with a protective cover sheet of polyethylene terephthalate over the photopolymer layer. Each of these elements were exposed to a Black Printer Positive and, after stripping off the cover sheet, dusted with either toner (A), (B) or (C), respectively as described in Example I of the above patent. After dusting, another layer of photopolymer was laminated over eah colored image at 105°C, post exposed as described in Example III of the above patent and the reflection density of each of the toned images read using a Quanta Log RD-100 Densitometer (MacBeth Daylighting Corp.) and the following results obtained:

| | Toner A | Toner B | Toner C Calculated(1) | Toner C Found | Toner C % Error(2) |
|---|---|---|---|---|---|
| Reflection Density | 1.91 | 0.80 | 1.35 | 1.78 | 31.9 |

(1) Calc. Density $= \frac{1.91 + 0.80}{2}$ (2) % Error $= \frac{1.78 - 1.35}{1.35} \times 100$ Thus, one can see that mixing the toners of the prior art without prior mixing with the inert powders of this invention does not produce a predictable intermediate density, and high error results.

The remaining examples demonstrate the use of inert powders within the ambit of this inventnion. All of the powders shown therein were tested for propensity to become electrostatically charged by bringing them into proximity to a charged polyethylene rod. All of the powders were inert to this charged rod in that they were neither repelled from or attracted to the rod.

EXAMPLE 2

A sample of black toner containing about 67% black pigment and about 33% resin (sample A of Example 1) was prepared as described in Example 1. Additionally a sample containing about 30% of black pigment in the resin was also prepared. Samples of the high strength (67%) toner were mixed with an inert powder exemplifying this invention, namely conventional polyethylene reduced to a small particle size of spherical shape (average diameter <20 micron). Various levels from 0 to 1 part of polyethylene per part of high strength toner were evaluated prior to blending equal parts of high and low strength toners. These mixtures were then used to tone images formed as described in Example 1 and the reflection density measured as shown therein. The % error from the calculated vs. actual density found was measured and is shown in each case below:

| Amt. of Polyethylene Added, Parts/Part of High Strength Toner | Reflection Density Found | Approx. % Error[(1)] |
|---|---|---|
| 0 | 1.87 | 14.4 |
| 0.25 | 1.79 | 5.2 |
| 0.50 | 1.64 | 3.9 |
| 1.00 | 1.30 | 0 |

[(1)]After blending equal parts high strength with low strength toner. Thus the optimum level for this type of inert powder is 1.0 parts per part of toner and no error is found in blending at this level.

EXAMPLE 3

In this example a toner was prepared as described in Example 1 except that the high strength toner contained, when dry, 35% of a magenta pigment (Colour Index Pigment Red 122) and the low strength about 6% of the same magenta pigment. Prior to blending equal parts of the high with the low strength toner, the high strength toner was further mixed with polyethylene inert powder as described in Example 2. The same photosensitive element described in Example 1 was exposed to a Green Record Positive (see Example I of U.S. Pat. No. 3,649,268) and the blended Magenta toners of this example used to dust the image obtained. The following results were noted:

| Amt. of Polyethylene Added, Parts/Part of High Strength Toner | Reflection Density Found | Approx % Error[(1)] |
|---|---|---|
| 0 | 1.24 | 20.7 |
| 0.50 | 1.28 | 6.3 |
| 0.75 | 1.21 | 0 |

[(1)]After blending equal parts of high and low strength toners.

EXAMPLE 4

The Magenta toners of Example 3 were prepared. Prior to blending high with low strength toner, the high strength toner was mixed with various amounts of a mildly oxygenated Fischer-Tropsch hydrocarbon hardwax (m.p. 210°–215°F), particle size range 37—500$\mu$. Photopolymer elements of Example 3 were then exposed, the cover layer peeled off and the exposed layer dusted with the toners made herein with the following results:

| Amt. of Hydrocarbon Wax, Parts/Part of High Strength Toner | Reflection Density Found | % Error[(1)] |
|---|---|---|
| 0 | 1.24 | 20.7 |
| 0.20 | 1.41 | 10.0 |
| 0.50 | 1.65 | 6.5 |
| 1.00 | 1.63 | 0 |

[(1)]After blending equal parts of high and low strength toners.

EXAMPLE 5

The high strength Magenta toner of Example 4 already containing 0.5 parts of hydrocarbon wax per part of toner, was further mixed with 0.25 parts of the polyethylene particles of Example 2 by thoroughly blending in a conventional blender. Subsequently, this high strength toner was mixed with an equal weight of low strength toner (same as in Example 3) and used to tone an image described in Example 3 with the following results:

| | Sample | Reflection Density Found | % Error[(1)] |
|---|---|---|---|
| (A) | Control - no inert powder added to the high strength toner | 1.24[(2)] | 20.7[(2)] |
| (B) | High strength toner with 0.5 parts hydrocarbon wax/part high strength toner | 1.65[(2)] | 6.5[(2)] |
| (C) | B + 0.25 parts polyethylene/part high strength toner | 1.68 | 0 |

[(1)]After blending equal parts high and low strength toners.
[(2)]Results from Example 4.

This example shows that the addition of two of the inert powders of this invention serves not only to substantially eliminate the blending error but additionally to increase the reflection density resulting in a considerable savings of the more expensive pigment used in this instance.

EXAMPLE 6

The Magenta Toners of Example 3 were prepared. Prior to blending high with low strength toner, the high strength toner was further mixed with various portions of cellulose acetate inert powder (less than 105 microns in size). The blended toners were then used to dust on an imaged photopolymer element as described in Example 3 with the following results:

| Amt. of Cellulose Acetate, Parts/Part of High Strength Toner | Reflection Density Found | % Error[(1)] |
|---|---|---|
| 0 | 1.24 | 20.7 |
| 0.50 | 1.21 | 11.1 |
| 1.00 | 1.22 | 5.8 |
| 3.00 | 1.14 | 0 |

[(1)]After blending equal parts of high and low strength toners.

EXAMPLE 7

The Magenta Toners of Example 3 were prepared. Prior to blending the high with low strength toner, the high strength toner was further mixed with various portions of inert particulate methyl methacrylate resin beads (inherent viscosity of polymer 1.20 in solution, 0.25g in 50 ml. $CHCl_3$ at 20°C., No. 50 Cannon-Fenske viscometer, 95% of said resin beads passing a 100 mesh screen). The blended toners were then used to dust on an imaged photopolyer element as described in Example 3 with the following results:

| Amt. of Polymethylmethacrylate, Parts/Part of High Strength Toner | Reflection Density Found | % Error(1) |
|---|---|---|
| 0 | 1.24 | 20.7 |
| 1.00 | 1.31 | 8.3 |
| 1.50 | 1.27 | 2.3 |

(1)After blending equal parts of high and low strength toners.

EXAMPLE 8

Magenta toners similar to those described in Example 3 were prepared. Prior to blending the high with the low strength toner, the high strength toner was further mixed with the inert powders of this invention in the following proportions:

1 part by volume 35% Magenta Toner 0.068 parts by volume hydrocarbon wax (as described in Example 4)

1 part by volume polymethylmethacrylate resin beads (as described in Example 7)

The blended toners were then used to dust on an imaged photopolymer element as described in Example 3 with the following results:

| Sample | Reflection Density Found | % Error(1) |
|---|---|---|
| Control — no inert powder added | 1.33 | 23.3 |
| After adding wax and polymethylmethacrylate per above | 1.60 | 6.1 |

(1)After blending equal parts of high and low strength toners.

Thus it can be seen a distinct advantage in reflection density increase was observed when two of the inert powders were added over that obtained in the preceding Example 7.

EXAMPLE 9

A Violet Toner was prepared by the methods of Example 1 using Colour Index Pigment Violet 23, the high strength toner having about 30% pigment dispersed on the cellulose acetate resin and the low strength having about 5% dispersed thereon. Prior to blending high with low strength toner, the high strength toner was further mixed as follows:

140 grams high strength violet Toner
17 grams hydrocarbon wax (per Example IV)
157 grams polyethylene powder (per Example II)
Equal volume dry ice.

After pulverizing this mixture the blended toners were then used to dust on an imaged photopolymer element as described in Example 3 with the following results:

| Sample | Reflection Density Found | % Error(1) |
|---|---|---|
| Control — no inert powder added | 1.90 | 19.3 |
| After mixing wax plus polyethylene powder | 1.71 | 0 |

(1)After blending equal parts of high and low strength toners.

EXAMPLE 10

A Yellow Toner was prepared by the methods of Example 1 using Colour Index Pigment Yellow 74, the high strength toner having about 30% pigment dispersed on the cellulose acetate resin and the low strength having about 5% pigment dispersed thereon. Prior to blending the high and low strength toners, the high strength tcn er was further mixed with various amounts of the polyethylene inert powders of Example 2. The blended toners were then used to dust on an imaged photopolymer element as described in Example 1 with the following results:

| Amt of Polyethylene, Parts/Part of High Strength Toner | Reflection Density Found | % Error(1) |
|---|---|---|
| 0 | 1.09 | 13.2 |
| 0.25 | 1.06 | 4.7 |
| 0.50 | 1.02 | 1.2 |

(1)After blending equal parts of high and low strength toners.

EXAMPLE 11

The Yellow Toners of Example 10 were prepared. Prior to blending the high and low strength toner, the high strengh toner was further mixed with 1.0 parts of the cellulose acetate inert powder of Example 5, per part of high strength toner. The blend of equal parts high and low strength toners was then used to dust on an imaged photopolymer element described in Example 1 whereby the Reflection Density of the toned image was found to be 1.08 with a 2.3% error from that calculated (compared to 13.2% error when blended yellow toner without the cellulose acetate was used).

EXAMPLE 12

A Scarlet Toner was prepared by the methods of Example 1 using Colour Index Pigment Red 123, the high strength toner having about 50% pigment dispersed on the cellulose acetate resin and the low strength having about 11% pigment dispersed thereon. Prior to blending high and low strength toners, the high strength toner was further mixed with various amounts of polyethylene inert powder of Example 2. The blended toners were then used to dust on an imaged photopolymer element as described in Example 1 with the following results:

| Amt. Of Polyethylene, Parts/Part of High Strength Toner | Reflection Density Found | % Error(1) |
|---|---|---|
| 0 | 1.35 | 24.0 |
| 2.0 | 1.26 | 3.1 |
| 3.0 | 1.25 | 0 |

(1)After blending equal parts of high and low strength toners.

EXAMPLE 13

The Magenta Toners of Example 3 were prepared. Prior to blending the high with the low strength toner, the high strength toner was further mixed with 1.0 part of an inert particulate methyl methacrylate (resin beads as described in Example 6 except that the resin beads were additionally coated by mixing with 4% by weight of octadecyl alcohol) per part of high strength toner. The blend of equal parts high and low strength toner (with and without the inert particles above) was used to dust on an imaged photopolymer element as described in Example 2 with the following results:

| Amt. of Resin Beads, Parts/Part of High Strength Toner | Reflection Density Found | % Error |
|---|---|---|
| 0 | 1.24 | 20.7 |
| 1.0 | 1.37 | 1.0 |

EXAMPLE 14

The Black Toners of Example 2 were prepared. Prior to blending the high with the low strength toner, the high strength toner was further mixed with 2.0 parts of the methylmethacrylate resin beads of Example 9 per part of high strength toner. The blend of equal parts high and low strength toner (with and without the resin beads above) was used to dust on an imaged photopolymer element as described in Example 1 with the following results:

| Amt. of Resin Beads, Parts/Part of High Strength Toner | Reflection Density Found | % Error |
|---|---|---|
| 0 | 1.80 | 25.2 |
| 2.0 | 1.90 | 5.2 |

EXAMPLE 15

A Magenta toner similar to that of Example 3 containing 32% of the magenta pigment dispersed in a cellulose acetate (as described in Example 1) was prepared. A sample of this toner (100 g.) was tumbled with a portion (28.2 g.) of the Fischer-Tropsch Hydrocarbon Hard Wax described in Example 4 (0.135 parts by volume of wax per 1.0 part by volume of toner). No grinding was used to mix the wax with the toner. Aliquots of this mixture were heated at 120°–130°C. for the period of time indicated below. Portions were then withdrawn and the reflection density of an image toned from the toner obtained therewith was determined as well as the blending errror (from blending with a 6% Magenta Toner) with results as shown:

| Time at 120–130°C. | Reflection Density Found | % Error[1] |
|---|---|---|
| 0 — No wax control | 1.17 | 24.7 |
| 0 | 1.23 | 29.5 |
| 4 hrs. | 1.56 | 20.9 |
| 8 hrs. | 1.59 | 3.8 |
| 16 hrs. | 1.51 | 1.7 |

[1]After blending equal parts of high strength (32%) with low strength (6%) toner.

These results illustrate that simply heating the toner with the particles of this invention not only will correct the blending error problem, but additionally achieves a higher density toner which results in an increase in covering power.

The advantage of increased covering power must otherwise be achieved by prolonged blending of toner plus particle as shown in the next example.

EXAMPLE 16

A Magenta Toner containing 35% magenta pigment dispersed in cellulose acetate (same as Example 3) was prepared and mixed with a portion of Fischer-Tropsch wax (Example 4) so that the mixture contained 1 part by volume of toner per 0.25 part by volume of wax. This material was thoroughly blended in an "Osterizer" Liquifier Blender (John Oster Mfg. Co.). Aliquots were removed at different times and during different speed cycles and tested for color density of the image toned from the toner prepared therewith with the following results:

| Mixing Time (Min.) | Mixing Speed Setting | Reflection Density Found |
|---|---|---|
| 1.0 | Lowest | 1.47 |
| 1.0 | Lowest | 1.50 |
| 1.0 | Highest | 1.59 |
| 2.0 | Highest | 1.63 |
| 4.0 | Highest | 1.65 |
| 6.0 | Highest | 1.63 |

Additionally, all of the high strength toner material prepared above exhibited essentially no blending error when mixed with equal parts of a low strength (6%) Magenta Toner.

Thus it can be seen, and has been demonstrated by example, that the inert powders and particles of this invention allow one to accurately blend high and low strength toners to a predictable reflection density value. All the images produced were of excellent quality and were stain free and, in many cases, higher covering power was also achieved. The inert powders of this invention may be admixed with the toners by any conventional means such as in a blender, ball-mill, hammer-mill, stirrer or even by shaking thoroughly in a closed container. A plurality of different inert powders may be added individually in the same toner or, alternatively, one may use a mixture of inert powders to achieve the desired property of toner blendability and higher reflection density of the toner image described herein. A single inert powder may also be used, and the singular shall accordingly be construed to include the plural and vice versa as regards reference to the inert powder herein.

I claim:

1. A colorant of predictable reflection density comprising a mixture of at least one inert powder selected from organic and silicone compounds having an average particle size of 1 to 1000 microns and at least two particulate, pigmented resins having different reflection densities, said colorant being made by mixing said pigmented resins together, at least one of said pigmented resins containing at least one said inert powder before mixing, said inert powder being unreactive with said pigmented resins and being present in said mixture in an amount of 0.1 to 100 parts of inert powder per part, by volume, of one of said pigmented resins.

2. The colorant of claim 1 wherein said pigmented resins have an average particle size of about 0.2 to 50 microns, not more than 2% of the pigmented resin particles being larger than 105 microns in diameter.

3. The colorant of claim 1 wherein said inert powder is non-electroscopic and has a melting point between 40° and 300°C.

4. The colorant of claim 1, wherein the colorant reflection density is a linear proportion of the volume concentrations and reflection densities of the pigmented resins.

5. The colorant of claim 1 wherein one or more inert powders as described in claim 1 are contained in the pigmented resin of higher reflection density before the pigmented resins are mixed.

6. The colorant of claim 1 wherein the amount of said inert powder in said colorant is sufficient to reduce the difference between the actual and predicted reflection densities of said colorant to less than about 10% of the predicted reflection density.

7. The colorant of claim 1 wherein said particulate, pigmented resins are comprised of cellulose acetate particles having pigment particles imbedded in their surfaces.

8. The colorant of claim 1 wherein said inert powder is selected from particulate polyethylene, hydrocarbon wax, cellulose acetate and methyl methacrylate resin.

9. A process of preparing a colorant having a predetermined reflection density comprising mixing one or more inert powders and the particulate, pigmented resins of claim 1 in amounts determined by the reflection densities of said pigmented resins, said inert powders being unreactive with said pigmented resins and being present in said mixture in an amount of 0.1 to 100 parts of inert powders per part, by volume, of one of said pigmented resins.

10. A process of preparing a colorant having a predetermined reflection density comprising mixing at least two particulate colored materials, each colored material containing one of the particulate, pigmented resins of claim 1 and at least one of said colored materials containing at least one inert powder of claim 1, said colored materials being mixed in amounts determined by the reflection densities of said colored materials to produce a colorant having a reflection density intermediate between the reflection densities of said colored materials and proportional to the volume concentrations and reflection densities of said colored materials, said inert powder being unreactive with said pigmented resins and being present in said colorant in an amount of 0.1 to 100 parts of inert powder per part, by volume, of one of said pigmented resins.

11. A process according to claim 11 wherein the reflection density of the colorant produced does not vary from the value predicted by a linear proportion between volume concentrations and reflection densities of said colored materials by more than 10% of the predicted value.

12. A process according to claim 10 wherein said inert powder is contained in the colored material of higher reflection density before the colored materials are mixed.

13. A colorant comprising one or more pigmented resins having an average particle size of about 0.2 to 50 microns, not more than 2% of the pigmented resin particles being larger than 105 microns in diameter, and a plurality of different inert powders selected from organic and silicone compounds and having an average particle size of 1 to 1000 microns, said inert powders being unreactive with said pigmented resins and being present in said mixture in an amount of 0.1 to 100 parts of inert powders per part, by volume, of one of said pigmented resins.

14. The colorant of claim 4 wherein said pigmented resins are of the same color and said inert powder is substantially colorless.

15. A process according to claim 10 wherein said pigmented resins are of the same color and said inert powder is substantially colorless.

* * * * *